UNITED STATES PATENT OFFICE.

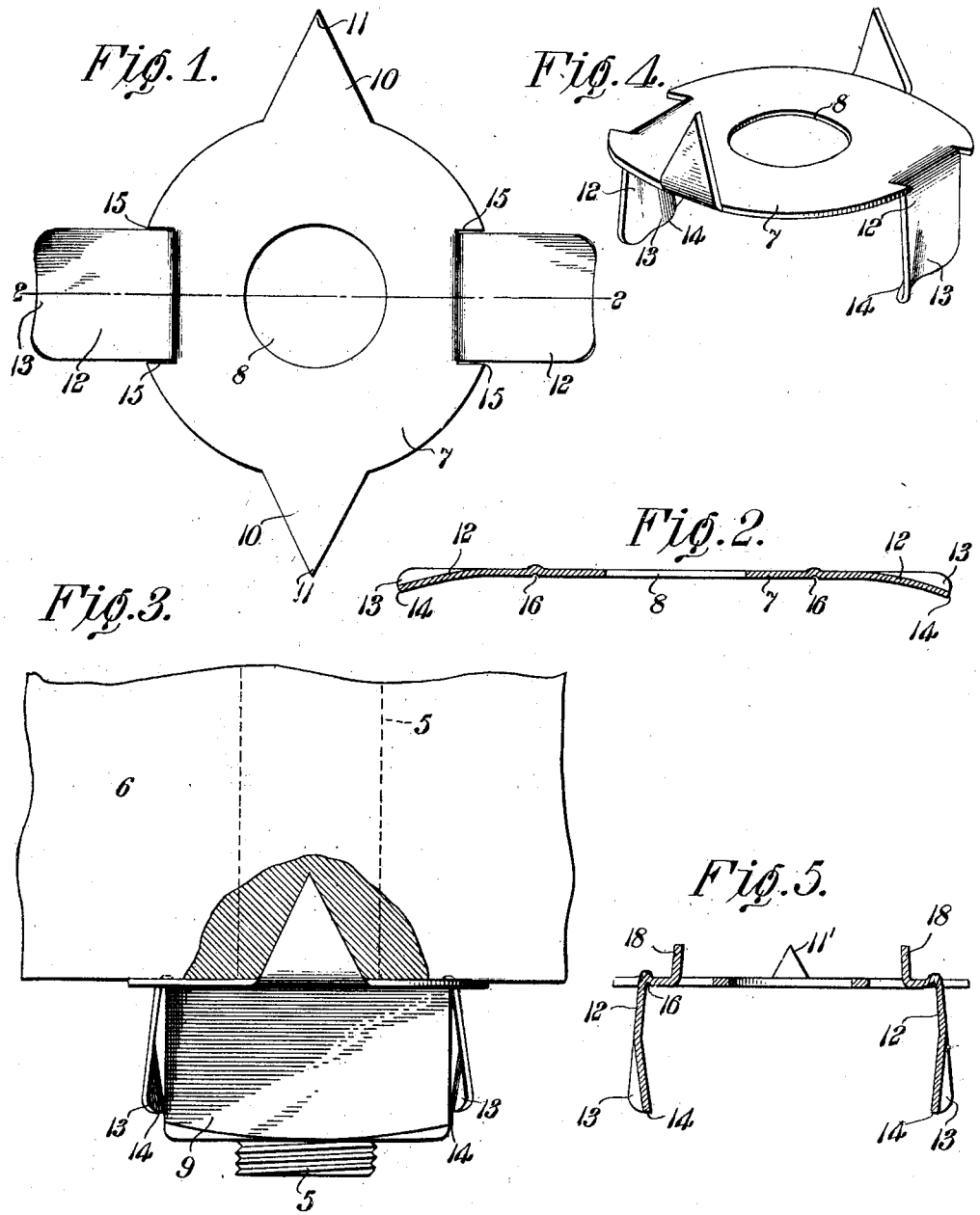

ERNEST JAY FOREMAN, OF TRINIDAD, COLORADO, ASSIGNOR OF ONE-HALF TO FRED H. HEE, OF TRINCHERA, COLORADO.

NUT-LOCK.

No. 855,396.　　Specification of Letters Patent.　　Patented May 28, 1907.

Application filed January 23, 1907. Serial No. 353,707.

*To all whom it may concern:*

Be it known that I, ERNEST JAY FOREMAN, a citizen of the United States, residing at Trinidad, in the county of Las Animas and State of Colorado, have invented a new and useful Nut-Lock, of which the following is a specification.

This invention relates to nut locks and more particularly to means for preventing accidental displacement of the nuts employed for locking the metallic pins of insulators in position on the cross arm of a telegraph or telephone pole or other suitable support.

The object of the invention is to provide a locking washer designed to be positioned between the nut and cross arm or other support and having integral attaching spurs adapted to pierce the cross arm when the nut is adjusted on the threaded pin or bolt.

A further object is to provide a washer having oppositely disposed locking ears adapted to be bent laterally into engagement with the adjacent walls of the nut, said ears being provided with terminal depressions or concavities for the reception of a tool thereby to assist in bending said ears in engagement with the nut.

A further object is to provide a washer having slits extending inwardly on each side of the locking ears whereby said ears may be bent into engagement with nuts of different sizes and shapes.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a plan view of a washer constructed in accordance with my invention showing the washer before the same is bent into shape. Fig. 2 is a longitudinal sectional view taken on the line 2—2 of Fig. 1. Fig. 3 is a side elevation showing the washer in position on the attaching pin of an insulator. Fig. 4 is a perspective view of the washer detached. Fig. 5 is a longitudinal sectional view illustrating a modified form of the invention.

Similar numerals of reference indicate corresponding parts in all of the figures of the drawings.

The improved washer is principally designed for preventing accidental displacement of the nuts employed for locking the metallic pins of insulators on cross arms and the like and by way of illustration is shown applied to an insulator pin of the ordinary construction in which 5 designates the pin and 6 the cross arm.

The improved washer is preferably stamped or otherwise formed from a single piece of metal and consists of a substantially circular body portion 7 having a centrally disposed opening 8 formed therein for the reception of the pin 5, said washer being interposed between the cross arm 6 and nut 9, as best shown in Fig. 3 of the drawings. The body portion 7 is provided with laterally extending attaching spurs 10 adapted to be bent at an angle to the adjacent surface of the body portion 7 so that when the nut 9 is adjusted on the pin the spurs will be driven into the wood constituting the cross arm 6 and thus lock the washer in position on said cross arm. Attention is here called to the fact that the piercing points 11 of the spurs 10 are deflected inwardly toward the bolt-receiving opening 8 so that when the spurs are driven into the support 6 they will firmly grip the fiber of the wood to form in effect a locking key.

Extending laterally from opposite sides of the circular body portion 7 and preferably disposed at right angles to the attaching spurs 10 are locking ears 12 adapted to be bent laterally into engagement with the side walls of the nut 9, the terminals of said ears being provided with depressions or concavities 13 adapted to receive the point of a suitable tool so that said ears may be conveniently bent laterally into engagement with the nut. The depressions 13 not only serve to receive the point of the tool when bending the locking ears to operative position but also form spring locking lips 14 which bear against and bite into the side walls of the nut thus serving to prevent accidental rotation of said nut.

Extending inwardly from the opposite sides of the body portion 7 at the ears 12 are parallel slits 15, the object of which is to permit the ears to be bent into engagement with nuts of different sizes and shapes. When the washer is used in connection with a standard size nut the body portion 7 is preferably provided with a transverse depression or weakening groove 16 disposed at the juncture of each locking ear with the body portion, whereby when the ears are pressed laterally they will bend at said grooves.

In using the device the washer is positioned on the pin 5 with the spurs 10 bearing against the adjacent surface of the cross arm after which the nut 9 is adjusted on the pin thus forcing the spurs into engagement with the wood. The locking ears or tongues 12 are then bent laterally into engagement with the sides of the nut by introducing the point of a chisel, screw-driver or other tool within the depressions 13 and pressing laterally on said tool thus locking the ears in engagement with the sides of the nuts and effectually preventing accidental rotation of the latter.

In Fig. 5 of the drawings, there is illustrated a modified form of the invention in which the attaching spurs or lugs 18 are preferably stamped or struck up from the body of the washer, the device being otherwise similar in construction to the washer shown in Fig. 1 of the drawings. If desired, however, the lugs 11 may also be used in connection with this form of the device and by way of illustration said lugs are indicated at 11'.

When the washer is used in connection with a metallic surface such as a fish plate, suitable openings or depressions may be formed in the fish plate for the reception of correspondingly shaped depressions formed in the washer.

While the device is principally designed for use in connection with the metallic pins of insulators, it is obvious that the same may be used with equally good results on the clamping nuts of rail joints, bridge joints or for wagon work, car building, or wherever a device of this kind is found desirable.

Having thus described the invention what is claimed is:

1. The combination with a support having a bolt extended there-through and provided with a clamping nut, of a washer interposed between the nut and support and provided with attaching spurs adapted to pierce the support, oppositely disposed ears formed integral with the washer and provided with terminal depressions defining inwardly extending spring locking lips adapted to bear against the sides of the nut, there being slits formed in the washer on each side of the locking ears and connected by transverse weakening grooves thereby to permit the ears to be bent laterally into engagement with the nut.

2. The combination with a support having a bolt extended there-through and provided with a clamping nut, of a washer interposed between the nut and support and provided with attaching spurs adapted to pierce the support, locking ears extending from opposite sides of the washer and each provided with a terminal depression defining a spring locking lip adapted to bear against the adjacent walls of the nut, there being slits formed in the washer on each side of the locking ears, and a transverse weakening groove connecting said slits at the juncture of the ears with the washer.

3. As an article of manufacture, a washer formed of a single piece of metal having a bolt-receiving opening formed therein and provided with oppositely disposed locking ears the terminals of which are provided with depressions defining spring locking lips, there being slits extending inwardly from the peripheral edge of the washer at said locking ears, a transverse weakening groove connecting said slits at the base of said ears, and attaching spurs disposed at an angle to one face of the plate and extending in a direction opposite the locking ears.

In testimony that I claim the foregoing as my own, I have hereto affixed my signature in the presence of two witnesses.

ERNEST JAY FOREMAN.

Witnesses:
H. K. HOLLOWAY,
E. S. BELL.